(12) United States Patent
Udagawa

(10) Patent No.: US 6,779,800 B2
(45) Date of Patent: Aug. 24, 2004

(54) HEAD GASKET

(75) Inventor: Tsunekazu Udagawa, Tokyo (JP)

(73) Assignee: Ishikawa Gasket Co., Ltd., Tokyo (JP)

(*) Notice: Subject to any disclaimer, the term of this patent is extended or adjusted under 35 U.S.C. 154(b) by 22 days.

(21) Appl. No.: 10/193,190

(22) Filed: Jul. 12, 2002

(65) Prior Publication Data

US 2003/0015844 A1 Jan. 23, 2003

(30) Foreign Application Priority Data

Jul. 19, 2001 (JP) .................................. 2001-219943

(51) Int. Cl.⁷ ................................................ F02F 11/00
(52) U.S. Cl. .................... 277/592; 277/594; 277/598
(58) Field of Search ............................ 277/592–5, 598, 277/600, 601

(56) References Cited

U.S. PATENT DOCUMENTS

| | | | | |
|---|---|---|---|---|
| 4,535,999 A | * | 8/1985 | Locacius | 277/596 |
| 4,620,710 A | * | 11/1986 | Lambert et al. | 277/596 |
| 5,161,809 A | * | 11/1992 | Matsushita et al. | 277/601 |
| 5,294,134 A | * | 3/1994 | Kawaguchi et al. | 277/595 |
| 5,385,354 A | * | 1/1995 | Hagiwara et al. | 277/594 |
| 5,628,518 A | * | 5/1997 | Ushio et al. | 277/593 |
| 5,653,451 A | * | 8/1997 | Udagawa | 277/595 |
| 5,906,376 A | * | 5/1999 | Udagawa et al. | 277/595 |
| 6,027,124 A | * | 2/2000 | Ishida et al. | 277/595 |
| 6,257,591 B1 | | 7/2001 | Abe et al. | |
| 6,422,573 B1 | * | 7/2002 | Sekioka | 277/594 |

FOREIGN PATENT DOCUMENTS

| JP | 8-285080 | * 11/1996 |
|---|---|---|
| JP | 10-184916 | * 7/1998 |

* cited by examiner

Primary Examiner—Alison Pickard
(74) Attorney, Agent, or Firm—Manabu Kanesaka

(57) ABSTRACT

A cylinder head gasket for sealing between a cylinder head and a cylinder block of an engine is formed of a base plate made of a first metal material, such as an annealed stainless material and a soft steel material, and at least one circumferential member made of a second metal material, such as a spring steel material, disposed at a portion for sealing a liquid hole provided on an area outside an area surrounded by bolt holes. On the circumferential member, there is provided a bead surrounding the liquid hole, and also, the circumferential member is integrally connected to the base plate.

8 Claims, 3 Drawing Sheets

HEAD GASKET

BACKGROUND OF THE INVENTION AND RELATED ART STATEMENT

The invention relates to a head gasket to be installed between two engine members, such as a cylinder head and a cylinder block, to seal therebetween.

More specifically, the present invention relates to a head gasket having high sealing ability and good durability even in an area outside an area surrounded by bolt holes or bolts for tightening the cylinder head and the cylinder block.

In case joint surfaces between the cylinder head and the cylinder block (cylinder body) of an engine of an automobile are sealed, a head gasket is installed therebetween to thereby seal combustion gas.

In view of the demand of light weight and low cost of the engine, the head gasket has been changed to a metal gasket having a simple structure of one or two metal plates from a laminate type gasket having a plurality of metal plates. Since the number of the constituting plates is reduced, the material to be used has been limited.

Therefore, in the laminate-type gasket formed of the plural metal plates, although a bead, grommet and shim, which can be used as a sealing device, are combined as desired and provided in double, in the laminate-type gasket formed of a few plates, the kind and number of sealing devices are limited, so that simplified sealing devices have to be used. Moreover, the area which can be used for the sealing devices is reduced due to making the compact engine.

The head gasket, as shown in FIG. 4, is formed in conformity with a shape of an engine member, such as a cylinder block, and provided with holes 2 for the cylinder bores (hereinafter referred to simply as "cylinder bore"), liquid holes 3 for circulating cooling water and engine oil (hereinafter referred to simply as "liquid hole"), holes 4 for the bolts (hereinafter referred to simply as "bolt hole") and the like. Then, beads 12, 13 as the sealing devices are disposed around the holes 2, 3 to be sealed, respectively.

Although the sealings are carried out by the same gasket between the same engine members, the sealing abilities required by the respective holes to be sealed are greatly different. In the cylinder bore 2, it is required to seal the combustion gas of high temperature and high pressure in the cylinder bore, while in the liquid hole 3, it is required to seal a liquid of relatively low temperature and low pressure.

With respect to the cylinder bore 2, the base plate for sealing that portion is made of an annealed stainless material or soft steel material excellent in heat resistance and the bending ability. Also, around each cylinder bore 2, there is provided a bead 12 capable of coping with the high temperature and high pressure, and having a good elasticity with a circular arc shape and a narrow width, which provides a good follow-up ability with respect to changes of spaces. Also, the cylinder bore 2 is surrounded by the bolt holes 4 for tightening the cylinder head and the cylinder block with the bolts to thereby obtain a large surface pressure by the tightening force.

While the bead 13 is provided around the liquid hole 3 to seal therearound, due to the structure of an engine, there is a case where the liquid hole 3 is located at an area B outside an area A surrounded by the bolt holes 4.

In this case, pressing force by the tightening bolts is acted on only one side of a portion for sealing the liquid hole 3, so that the surface pressure becomes small. To cope with the problem, it has been practiced that the height of the bead is made high, the width of the bead is made narrow, or the shape of the bead is made sharp.

However, in the area B outside the area A surrounded by the bolt holes 4, since only one side is fixed by the tightening bolts and the other side is not supported, a space between the cylinder head and the cylinder block is greatly changed by the cooling-heating temperature cycle through the operation of the engine.

Therefore, in case the portion for sealing the liquid hole 3 disposed in the area B outside the area A is made of the same metal material as that of the base plate for making a normal gasket, the follow-up ability with respect to the changes of the space becomes poor even if the shape of the bead is specially designed for it. Also, in case the gasket receives a great change, the gasket is liable to be subjected to creep relaxation. Thus, there has been a problem such that the sealing ability and durability with respect to the liquid holes 3 are not sufficient.

More specifically, since a deformable property with respect to the heat resistance and the bending ability is required in order to seal combustion gas of high pressure and high temperature around the cylinder bore 2, a material excellent in heat resistance and bending ability, such as annealed stainless material and soft steel material, is preferable. However, in the portion where a great change takes place at the time of the cooling-heating temperature cycle, a material capable of following up the change with an appropriate elasticity, such as a spring steel material, is preferable. Especially, in the area B outside the area A surrounded by the bolt holes 4, it is preferable to use the spring steel material.

However, with a structure wherein the entire base plate is made of the same metal material as in the conventional gasket, the above-stated both conditions can not be satisfied.

In view of the above problems, the present invention has been made and an object of the invention is to provide a head gasket having a thin plate structure, wherein in case joint surfaces of a cylinder head and a cylinder block of an engine are sealed by a metal head gasket, a cylinder bore in an area surrounded by bolt holes and a liquid hole disposed outside the area are both sealed by optimum metal materials, respectively, to thereby provide a head gasket having a good sealing ability and durability.

Further objects and advantages of the invention will be apparent from the following description of the invention.

SUMMARY OF THE INVENTION

In order to attain the above object, a head gasket according to the present invention seals between a cylinder head and a cylinder block of an engine, and a base plate of the head gasket is generally made of a first metal material, such as annealed stainless material or soft steel material. A circumferential member made of a second metal material, such as a spring steel material, is disposed to a portion for sealing a liquid hole formed in an area outside the area surrounded by the bolt holes for tightening the cylinder head and the cylinder block by bolts, and a bead surrounding the liquid hole is provided on the circumferential member. The circumferential member is integrally joined to the base plate.

In the above head gasket, it is preferable that a Vickers hardness of the first metal material is in a range of 70–200, and a Vickers hardness of the second metal material is in a range of 300 to 600.

In the head gasket, the circumferential member and the base plate are linearly integrated by the laser welding.

More specifically, as the first metal material for constituting the base plate, there are considered an annealed stainless material, soft steel material and the like having a small Vickers hardness, good heat resistance and bending ability, while as the second metal material for constituting the circumferential member, there are considered a spring steel material and the like having a large Vickers hardness and good elasticity. However, a combination of an annealed stainless material or soft steel material and a spring steel material is most preferable.

According to the structure, since the base plate for sealing the cylinder bores and covering portions compressed by the tightening bolts is made of the first metal material, such as annealed stainless material or soft steel material, having a Vickers hardness of 70–200, good sealing ability with respect to the cylinder bores and good fitness with the cylinder head, cylinder block and the like can be obtained.

Since the circumferential member for sealing the liquid holes disposed on the area outside the area surrounded by the bolt holes is made of the second metal material, such as the spring steel material, having the Vickers hardness of 300–600, preferably 350–450, even in the outside area where the change of space between the cylinder head and the cylinder block becomes large due to a vibration caused by the cooling-heating temperature cycle at the time of operation of the engine, the follow-up ability due to the elasticity of the second metal material is improved. Thus, the sealing ability and durability with respect to the liquid holes disposed on the area outside the area surrounded by the bolt holes can be improved.

In case the circumferential member and the base plate are joined, spot welding margins may be provided on the end portions of the circumferential member and the base plate, respectively, and the spot welding margins may be partially overlapped with each other and spot-welded. However, it is preferable that a joining portion is formed in a linear shape by the laser welding.

In case the circumferential member and the base plate are joined in the linear shape, since a laminating structure of the circumferential member and the base plate is not employed, the weight of the head gasket can be reduced as well as the material thereof is saved. Further, by welding the circumferential member and the base plate in the linear shape, the joining strength can be extremely improved when compared with the spot welding, so that even in case the vibration is relatively large and the circumferential member is supported only by one side, the fatigue failure is hard to occur.

Incidentally, the above described structure according to the present invention is especially effective when the number of the base plate of the metal gasket is one. However, even in case the number of the base plates is plural or the number of the base plates is more than two, i.e. a metal laminate gasket includes an intermediate plate, i.e. more than two, good effect can be obtained.

Also, the difference between the elastic coefficients of the base plate and the circumferential member may be made by the heat treatment process by locally carrying out a heat treatment, in addition to the joint of different metal materials.

DETAILED DESCRIPTION OF PREFERRED EMBODIMENTS

Next, with reference to the accompanying drawings, embodiments of head gaskets according to the present invention will be explained.

Figure 1:
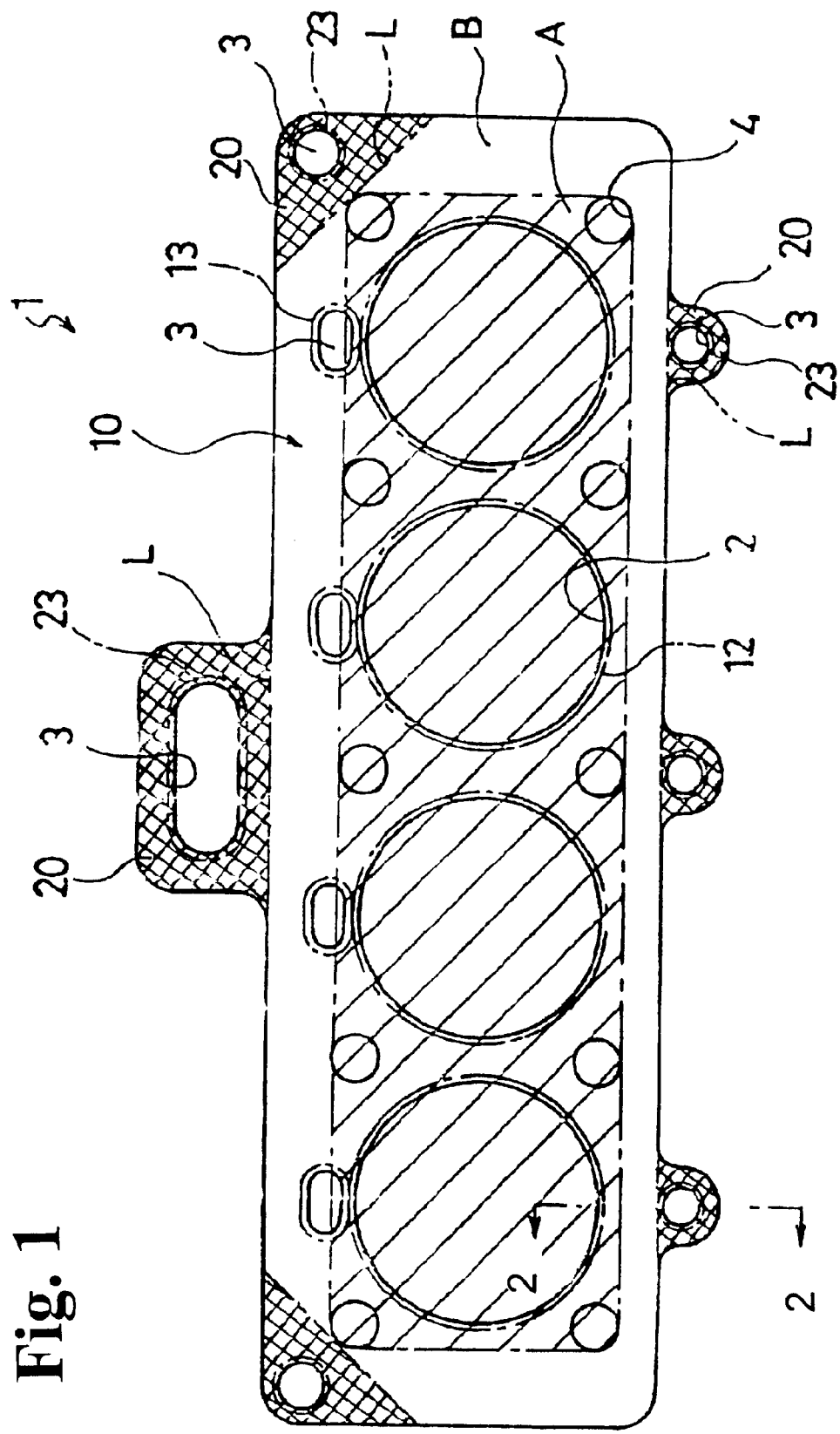
FIG. 1 is a plan view showing a head gasket of a first embodiment according to the present invention.

As shown in a plan view of FIG. 1, a head gasket 1 of an embodiment according to the present invention is a metal gasket to be installed between a cylinder head and a cylinder block (not shown) of an engine to seal combustion gas of high temperature and high pressure in a cylinder bore, and a liquid, such as cooling water and oil, passing through a cooling water path and a cooling oil path.

Figure 2:
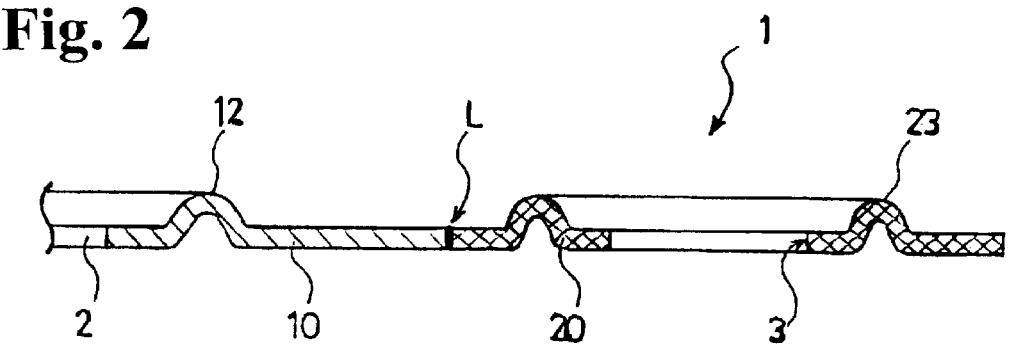
FIG. 2 is an enlarged sectional view taken along line 2—2 in FIG. 1 of the head gasket of the first embodiment according to the invention.
Figure 3:
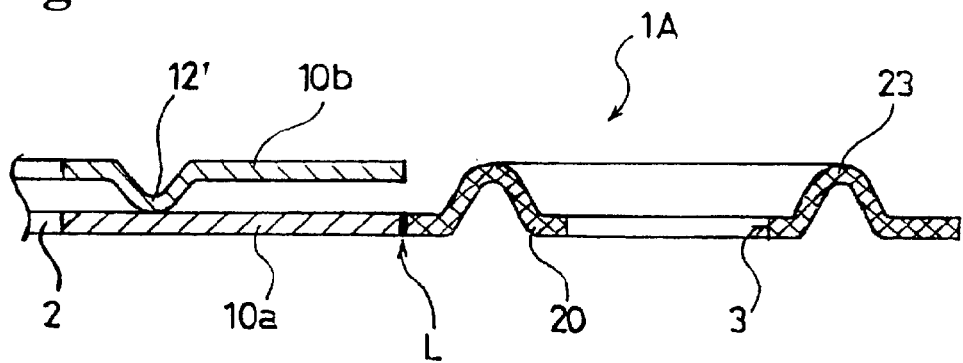
FIG. 3 is a sectional view, similar to FIG. 2, of the head gasket of the second embodiment according to the invention.
Figure 4:
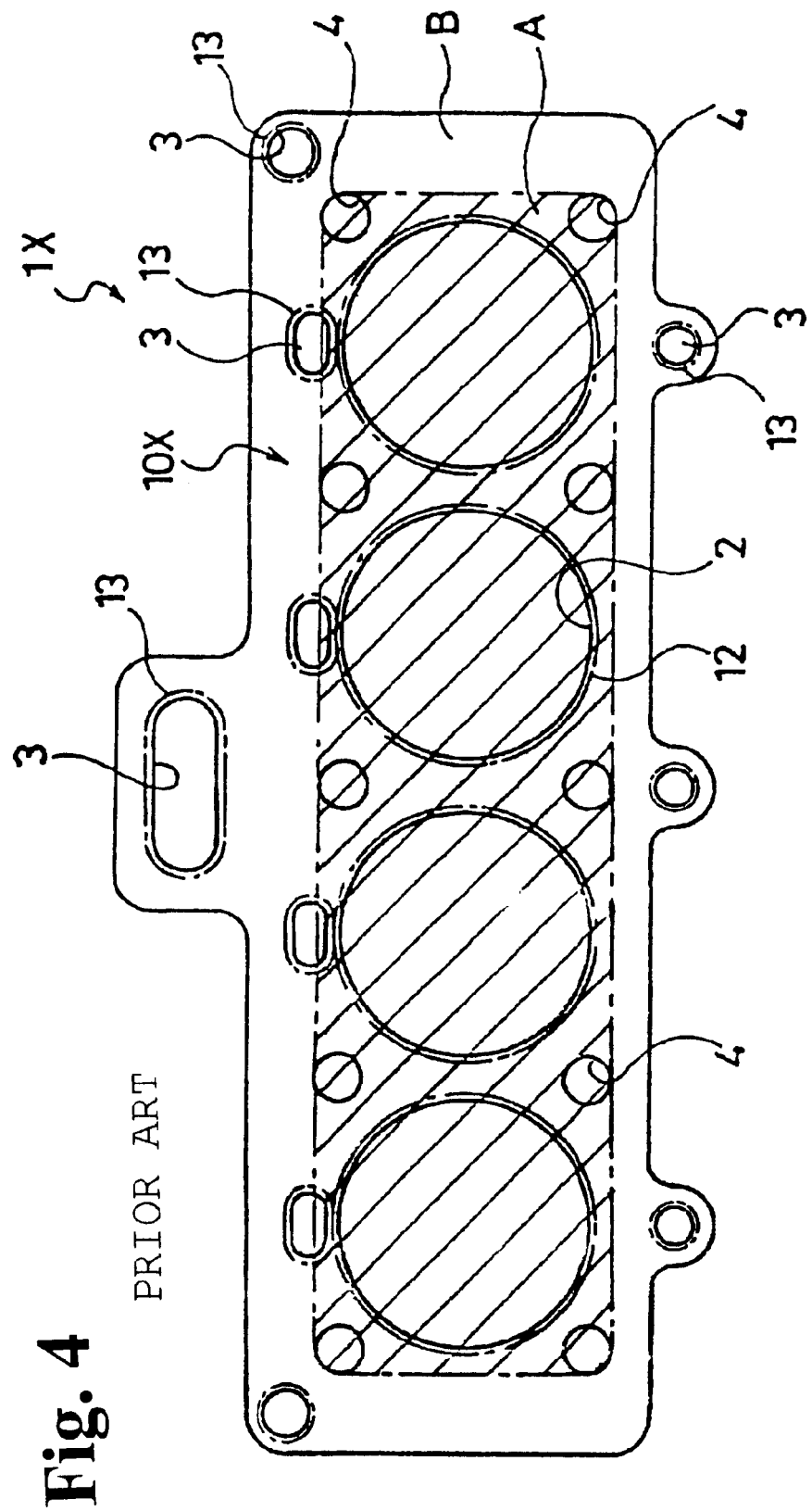
FIG. 4 is a plan view showing a conventional head gasket.

Incidentally, FIGS. 2 and 3 are explanatory schematic views, wherein a plate thickness, dimensions of a bead and a sealing groove and a ratio of length to width of the metal gasket are different from those actually measured to emphasize a sealing portion to thereby facilitate understanding thereof.

As shown in FIGS. 1 and 2, the head gasket 1 of the first embodiment according to the present invention is formed of a single constituting plate, and the constituting plate is formed of a base plate 10 and circumferential members 20 integrally joined thereto.

The base plate 10 is a member to cover a portion including an area A surrounded by the bolt holes 4 for bolts for tightening the cylinder head and the cylinder block, and is made of a first metal material, such as an annealed stainless material and soft steel material, having a high heat resistance and bending ability, with a Vickers hardness of 70–200.

The base plate 10 is provided with sealing devices, such as beads 12, for cylinder bores 2, and also sealing devices, such as beads 13, for cooling water and oil in the area covered by the base plate 10.

The outer circumferential members 20 are members for covering portions of an area B outside the area A surrounded by the bolt holes 4. The circumferential member 20 is made of a second metal material having an appropriate elasticity, such as a Vickers hardness of 300–600, preferably 350–450, of a spring steel material or the like.

The liquid hole 3 disposed in an area covered by the circumferential member 20 is sealed by a bead 23, such as a full bead and a half bead, surrounding the liquid hole 3.

The circumferential member 20 is integrally welded with the base plate 10 by laser beam in a linear shape L.

FIG. 1 shows an example of an arrangement of the base plate 10 and the circumferential members 20, wherein the base plate 10 is formed to completely cover the area A surrounded by the bolt holes 4, and the circumferential members 20 are formed to cover at least parts of the area B outside the area A. The areas that the circumferential members 20 cover are determined by considering the sealing abilities and the like required for the liquid holes 3 disposed in the area B.

Incidentally, in case the diameter of the cylinder bore is 80 mm, for example, the thickness of the base plate 10 is 0.2–1.0 mm; the height of the bead 12 for the cylinder bore 2 is 0.2–0.3 mm; the thickness of the circumferential member is 0.2–0.1 mm; and the height of the bead 23 for the liquid hole 3 is 0.2–0.4 mm.

According to the structure of the head gasket 1 as described above, the first metal material for forming the base plate 10 and the second metal material for forming the circumferential members 20 are different. Moreover, since the second metal material is a spring material, the respective holes 2, 3 to be sealed disposed in the respective areas can be sealed by the materials suitable therefor. Therefore, the head gasket 1 having a good sealing ability and durability can be obtained.

Also, since there is no overlapped portion between the base plate 10 and the surrounding member 20 through the joint by the laser welding in the linear shape L, the weight of the head gasket 1 can be lightened, and the materials can be saved.

Next, with reference to FIG. 3, a head gasket 1A of the second embodiment according to the present invention will be explained. The head gasket 1A is made of two base plates 10a, 10b. The base plate 10a is similar to the head gasket 1 of the first embodiment, but the beads 12, 13 for sealing around the cylinder bores 2 and liquid holes 3 are not formed thereon. Also, the beads 23 are made higher than that of the gasket 1.

The base plate 10b has the shape corresponding the portions where the base plate 10 extends, i.e. excluding the circumferential members 20. The base plate 10b has the bead 12' and other beads (not shown) to seal around the cylinder bores and liquid holes. The base plates 10a, 10b are laminated together to constitute the head gasket 1A. The head gasket 1A has the same operational effects as those of the head gasket 1. Incidentally, the base plate 10b made of one metal may have the shape exactly the same as that of the base plate 10a.

As has been described, according to the head gasket of the present invention, effects as described below can be obtained.

Since the base plate is made of the first metal material, such as an annealed stainless material and a soft steel material, and the surrounding members are made of the second metal material, such as a spring steel material, the base plate and the surrounding members are formed of metal materials suitable for the areas to be covered by the respective members. Therefore, good sealing abilities can be obtained for both the cylinder bore and liquid hole to thereby provide a head gasket having good durability.

More specifically, the first metal material, such as annealed stainless material and soft steel material, having a high heat resistance and a deformable property with respect to the bending process can be used in an area where the combustion gas of high pressure and high temperature is required to be sealed by a strong pressing force. On the other hand, the second metal material, such as spring steel material having an appropriate elasticity and good follow-up ability with respect to deformation can be used in the area, located outside the area surrounded by the bolt holes, where a pressing force is relatively small, temperature is relatively low and a space greatly changes.

Especially, since the circumferential members disposed outside the area surrounded by the bolt holes are made of the second metal material, such as the spring steel material, having good elasticity, even in the circumferential portions where a change in the space between the cylinder head and the cylinder block becomes large due to the vibration caused by operation of the engine through one side holding, the follow-up ability of the gasket with respect to the change in the space can be improved, and the sealing ability with respect to the liquid holes disposed on the circumferential portion can be improved. Thus, the durability can also be improved.

Since the joint between the circumferential members and the base plate is carried out by the laser welding in the linear shape, the overlapped portion between the circumferential member and the base plate can be eliminated to thereby reduce the weight of the head gasket and save the materials. Further, since the joining strength can be extremely improved through welding in the linear shape, it is possible to prevent the fatigue failure even in the area, outside the area surrounded by the bolt holes, where vibration is relatively large.

What is claimed is:

1. A head gasket for an internal combustion engine having at least one cylinder bore, bolt holes and at least one liquid hole, comprising:

a base plate having at least one first hole corresponding to the at least one cylinder bore, second holes corresponding to the bolt holes and surrounding the at least one first hole, an outer area outside imaginary lines linking the second holes outside the at least one first hole, and at least one third hole corresponding to the at least one liquid hole and located in the outer area, said base plate including a first portion covering at least an area inside the outer area including the first and second holes and being made of a material selected from the group consisting of annealed stainless steel and soft steel, and at least one second portion covering a part of the outer area including only one third hole and being made of spring steel, said second portion projecting outwardly from the first portion and being integrally fixed to the first portion, at least one bead formed on the second portion outside the at least one third hole for sealing the at least one third hole, and a bead integrally formed in the first portion around the at least one first hole for sealing around the at least one first hole.

2. A head gasket according to claim 1, wherein said first portion has a Vickers hardness in a range of 70–200, and the at least one second portion has a Vickers hardness in a range of 300 to 600.

3. A head gasket according to claim 2, wherein said first and second portions are linearly integrated by laser welding.

4. A head gasket for an internal combustion engine having at least one cylinder bore, bolt holes and at least one liquid hole, comprising:

a first portion including at least one first hole corresponding to the at least one cylinder bore, second holes corresponding to the bolt holes and surrounding the at least one first hole, and an outer area outside imaginary lines linking the second holes outside the at least one first hole, said first portion being made of a material selected from the group consisting of annealed stainless steel and soft steel, and at least one second portion forming a part of the outer area located outside the second holes and having only one third hole corresponding to the at least one liquid hole and one bead outside the third hole for sealing the same, said at least one second portion being made of spring steel and integrally fixed to the first portion.

5. A head gasket according to claim 4, further comprising sealing means formed around the at least one first hole for sealing around the at least one first hole.

6. A head gasket according to claim 5, wherein said sealing means is a bead integrally formed in the first portion.

7. A head gasket according to claim 4, further comprising an additional metal plate disposed on the first portion and at least one second portion forming a base plate for constituting a metal laminate gasket.

8. A head gasket according to claim 4, wherein a plurality of said second portions is fixed to the first portion, each having only one third hole.

* * * * *